May 24, 1932.    W. F. OBERHUBER    1,859,525
DISK FOR PIPE JOINTS
Filed April 8, 1926
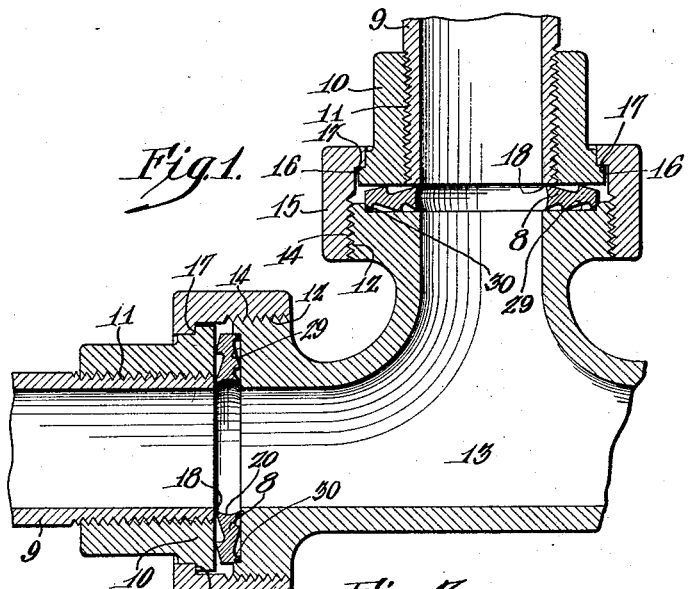
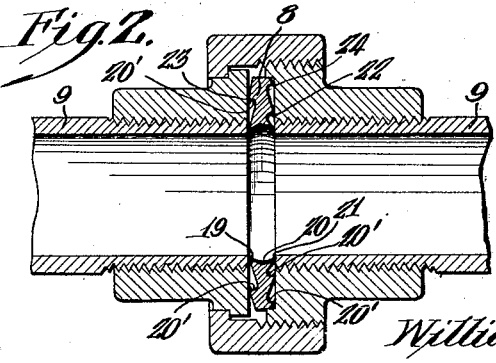
Inventor
William F. Oberhuber Patented May 24, 1932

1,859,525

UNITED STATES PATENT OFFICE

WILLIAM F. OBERHUBER, OF LANSDOWNE, PENNSYLVANIA

DISK FOR PIPE JOINTS

Application filed April 8, 1926. Serial No. 100,559.

My invention relates to disks used for gasket purposes in pipe and tube joints.

The main purpose of my invention is to use the spring of the body of the gasket to hold annular contacts resiliently to their duty.

A further purpose is to stagger annular contacts on opposite sides so that one or more on one side shall in radial distance from the axis lie between two on the opposite side.

A further purpose is to undercut opposite inner annular contacts on opposite sides preferably of equal diameter and to stagger corresponding undercut annular contacts of larger size on opposite sides of the annulus.

Further purposes will appear in the specification and in the claims.

I have preferred to illustrate my invention by one main form only, with slight modification, selecting a form which is practical, efficient and relatively inexpensive and which at the same time well illustrates the principles of my invention.

Figures 1 and 2 are longitudinal sections through joints of a pipe with a fitting and with a second pipe, respectively and illustrating my invention.

Figure 3 is an enlarged section of the disk shown in Figure 1.

Figures 4 and 5 are opposite side elevations of the disk of Figures 1, 2 and 3.

In all pipe lines carrying high pressure steam or oily contents difficulty has been found in making and maintaining tight joints. This becomes greater as the pressures rise and is further complicated, so far as the expense of replacement is concerned, by necessity for heat insulation. The expense of repairing a single leaking flanged joint of the type shown may thus exceed $100.00 without allowance for the loss of use of the plant which too frequently accompanies the change. Reliable flanged joints have therefore become of considerable importance.

In the drawings like numerals refer to like parts.

Describing in illustration and not in limitation and referring to the drawings:—

This application is a continuation in part of the subject matter of my application for high pressure steam joint, Ser. No. 59,462, filed September 30, 1925.

My disk 8 is intended to present sharp edges on opposite sides with flexing of the disk between them. In Figure 1 two of the disks are shown, each sealing between pipes 9 with their flanges 10 threaded at 11 upon them and the faces of flange 12 of a T or other fitting 13. The flange 12 is threaded at 14 to receive a union 15 whose shoulder 16 engages the shoulder 17 of the flange 10.

Because even the usual brazing of the flange 10 to the pipe sometimes does not make a good liquid-tight seal I prefer to face the pipe end as at 18 in line with the end face of the flange and to make one of the annular contacts with it by annular edge 19. I can undercut this contact to the best advantage (as at 20) because it lies upon the inner edge of the disk and can thus also undercut to equal advantage a contact 21 on the opposite side.

Where two pipes are joined, as in Figure 2, there is, of course, more reason for the use of this contact 20 which could be omitted in the form shown in Figure 1. However so much spring can be obtained axially by the double undercutting that the two contacts 19 and 21 work together very well.

The remaining annular contacts are staggered, 22 on one side lying, in diameter between 19 and 23 on the opposite side and 23 being larger in diameter than 22 and smaller than 24 on the opposite side from it. As a result pressure upon these annular contacts tends to bend the disk bodily as exaggerated in the line to the right of the disk in Figure 3. The disk bends to the right at 25 to the greatest extent opposite contact 23, and bends to the left as at 26, to the greatest extent opposite contact 22.

In all of the figures the teeth are saw teeth having contact at one edge, abruptly cut away at the edge as at 27 on one face and sloping away from the edge as at 28 on another face. However the teeth in Figure 2 differ from those in Figures 1 and 3 in that all of the teeth in Figure 2 are undercut as at 20, 20′ whereas the inner teeth only are undercut (as at 20′) in Figures 1 and 3.

Each of the teeth makes contact at the side initially along a line only or along a very narrow annular surface, the extent of final contact tending to increase with pressure as the spring of the metal permits the surfaces 28 relatively to flatten and the adjoining flange yields slightly to the pressure of the annuli.

Because of the slight spring in the metal of the flanges 10 and 12 their faces may desirably not be quite parallel initially but may diverge outwardly. They can both be very slightly coned.

The metal of one of the flanges is shown as recessed at 29 for the joint in order to provide a shoulder 30 about the recess as a centering and supporting device to hold the disk in position while the joint is being made.

The disks should be of resilient material which retains its resilience to and above any temperature to which the joint may be subjected. Such a material is found in high carbon steel, Monel metal, vanadium steel or chrome-nickel steel.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention what I claim as new and desire to secure by Letters Patent is:—

1. A disk for sealing engagement comprising an annulus of solid material having annular edges exposed for contact on its opposite side faces, the edges being undercut when viewed in radial section through the axis and located at the inner edge of the annulus and on opposite sides at a distance from the inner edge, alternating so that a contact on one side lies between contacts on the other side to utilize the spring of the body of the disk as well as that of the undercutting to give resilience to the contact.

2. An annular sealing disk of solid material concave at its inner face and cut away exteriorly adjacent the edges of the concavity to give sharp undercut contact edges at the inner face and having annular undercut contacts on opposite sides at different distances from the axis on one side than on the other side.

3. An annular sealing disk of solid material presenting a concaved interior face with sharp sealing edges limiting this face, converging outwardly from said sharp edges and having additional annular sharp sealing edges on opposite sides of the disk at different distances, on one side as compared with the other, from the axis of the disk.

4. An annular sealing disk of solid material presenting a concaved interior face with sharp sealing edges limiting this face, converging outwardly from said sharp edges and having additional annular sharp sealing edges on opposite sides of the disk at different distances, on one side as compared with the other, from the axis of the disk, the opposite sides of the disk converging, outwardly of these annular edges.

5. In a pipe joint a pipe having an initially separate flange united thereto and a facing flange adapted to cooperate therewith, a gasket between the flanges having a longitudinally concave interior face with sharp sealing edges, one of them engaging the end face of the pipe, said gasket having additional sharp sealing edges on opposite sides at different distances on one side as compared to the other from the axis of the disk and engaging the flanges.

6. An annular flange having a recess in its face, a disk fitting the recess and having a concaved disk interior with sharp sealing edges limiting the concaved interior and one of them engaging the bottom wall of the recess, a flange on the opposite side of the disk, a pipe within one of the flanges and exposed for engagement by the disk and annular sawtooth edges engaging the end pipe face adjacent the concaved disk interior and the flange and the bottom wall of the recess on opposite sides of the disk at a greater distance from the axis than the edges limiting the concavity.

7. In a pipe joint, a pipe having an initially separate flange united thereto and a facing flange adapted to co-operate therewith, a gasket between the flanges having an undercut sealing edge adapted to engage the end of the pipe, free from engagement with its flange, having on opposite sides of the gasket a plurality each of undercut annular sealing edges engaging the flanges and means for drawing the flanges together to tighten the undercut edges against the flanges.

8. In a pipe joint, a pipe having an initially separate flange united thereto and a facing flange adapted to co-operate therewith, means for drawing the flanges together and a sealing disk between the flanges having undercut sealing faces of annular form upon opposite sides of the disk, the innermost sealing face on one side engaging the end of the pipe to seal against it and not against its flange.

9. In a pipe joint, a pipe having an initially separate flange united thereto and a facing flange adapted to cooperate therewith, means for drawing the flanges together and a sealing disk between the flanges having annular sharp sealing edges upon the faces of the disk, an inner edge on one side engaging the end of the pipe and other edges located alternately at different distances from the pipe axis on different sides of the disk and engaging the flanges.

WILLIAM F. OBERHUBER.